(12) United States Patent  
Denecke et al.

(10) Patent No.: US 7,296,975 B2  
(45) Date of Patent: Nov. 20, 2007

(54) TWIST ELEMENT FOR A BEARINGLESS ROTOR

(75) Inventors: Ulrich Denecke, Neubiberg (DE); Gerald Kuntze-Fechner, Waakirchen (DE); Horst Bansemir, Munich (DE); Stefan Emmerling, Neubiberg (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 126 days.

(21) Appl. No.: 10/551,007

(22) PCT Filed: Dec. 13, 2003

(86) PCT No.: PCT/EP03/14215

§ 371 (c)(1),  
(2), (4) Date: Sep. 27, 2005

(87) PCT Pub. No.: WO2004/085248

PCT Pub. Date: Oct. 7, 2004

(65) Prior Publication Data

US 2006/0193727 A1    Aug. 31, 2006

(30) Foreign Application Priority Data

Mar. 27, 2003  (DE) ............................ 103 13 982

(51) Int. Cl.  
  *B64C 11/12* (2006.01)

(52) U.S. Cl. .......................... 416/134 R; 416/135  
(58) Field of Classification Search ............ 416/134 A, 416/135, 136  
See application file for complete search history.

(56) References Cited

U.S. PATENT DOCUMENTS

| 4,650,401 A |   | 3/1987  | Yao et al. ............... 416/134 |
| 4,892,461 A | * | 1/1990  | Matsumoto et al. ..... 416/134 A |
| 5,358,381 A |   | 10/1994 | Covington et al. ........ 416/134 |
| 6,805,948 B2 | * | 10/2004 | Yasui .................... 428/301.4 |

FOREIGN PATENT DOCUMENTS

| DE | 29 17 301    | 10/1980 |
| EP | 0 323 857 B1 | 7/1989  |
| FR | 2 608 554    | 6/1988  |

* cited by examiner

*Primary Examiner*—Ninh H. Nguyen  
(74) *Attorney, Agent, or Firm*—Darby & Darby

(57) ABSTRACT

A twist element for a bearingless rotor is made mostly of composite fiber material and has a cross section with a substantially symmetric, flattened shape that has approximately the contour of a horizontal, central section of a double cone. In addition, a bearingless rotor having at least one such twist element, and a rotorcraft, particularly a helicopter, having at least one rotor with at least one such twist element are provided.

17 Claims, 1 Drawing Sheet

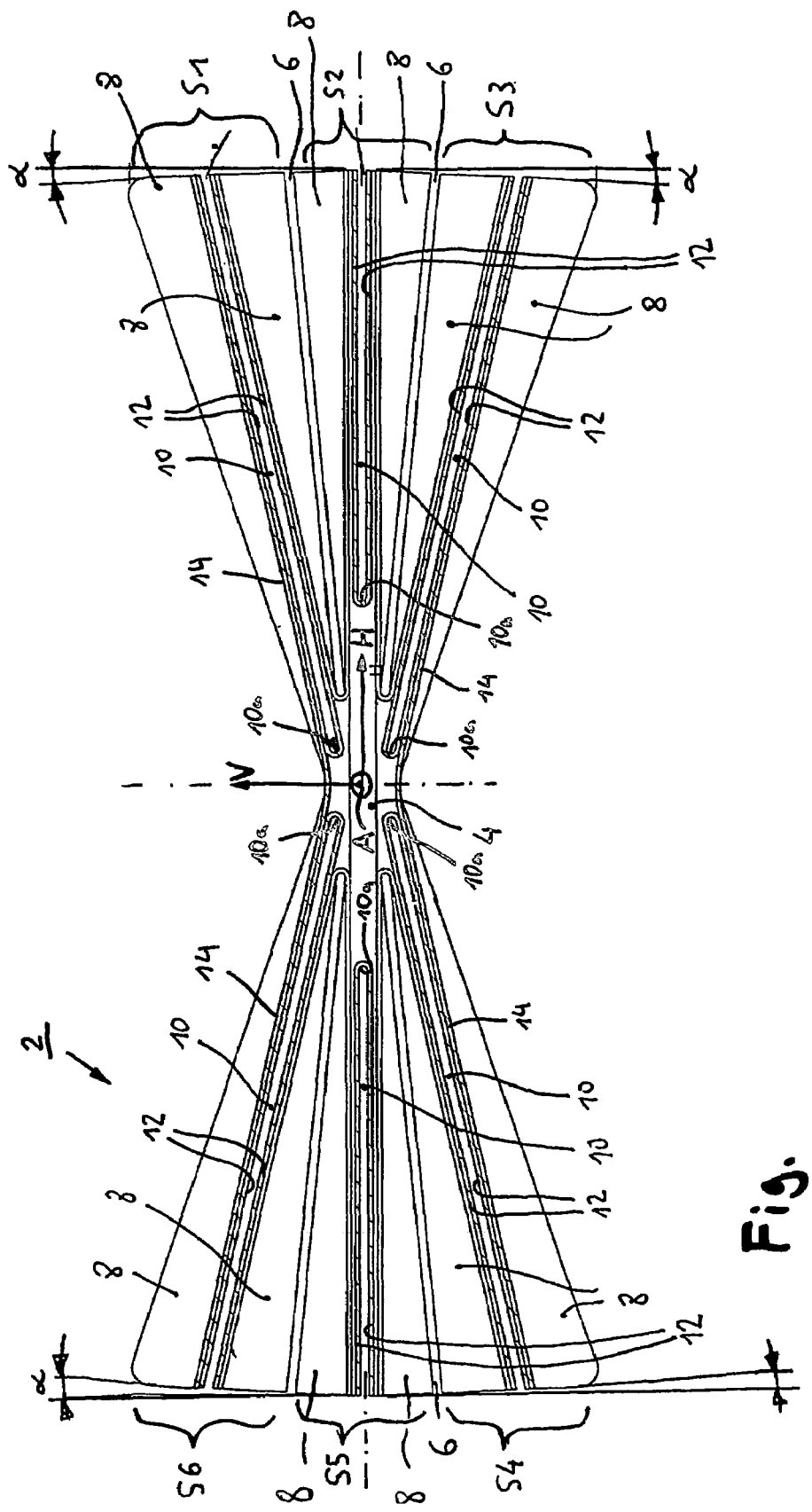

TWIST ELEMENT FOR A BEARINGLESS ROTOR

The present invention relates to a twist element for a bearingless rotor. Furthermore, the invention relates to a bearingless rotor having such a twist element as well as to a rotorcraft, particularly a helicopter, having such a rotor.

BACKGROUND

European patent application 0 323 857 B1 discloses a bending plate to be installed on a rotor mast, comprising a rotor mast attachment section, a rotor blade attachment section that is arranged at one free end of the bending plate and that is in the form of two bushings as well as a swing-flexible and torsion-flexible intermediate area that is situated between the rotor mast attachment section and the rotor blade attachment section and that forms a twist element. The twist element has an approximately H-shaped cross section that is formed by a centered, strip-shaped element and by two elements arranged laterally thereto, each of which has a cross section in the shape of a horizontal Y. The legs of the Y-shaped cross section are greatly spread apart. The H-shaped cross section or its combined individual elements have an essentially constant material thickness. The bending plate is made predominantly of composite fiber material. Due to the H-shaped cross section as well as the great spread of the legs of the Y-shaped cross section, an unfavorable warpage of the cross section profile can occur when the twist element is subjected to torsion.

U.S. Pat. No. 5,358,381 describes a yoke to be installed on a rotor mast, comprising a rotor mast attachment section, followed by a plate-shaped impact-flexible area, a rotor blade attachment section that is arranged at one free end of the yoke and that is in the form of two bushings as well as a swing-flexible and torsion-flexible intermediate area that is situated between the impact-flexible area and the rotor blade attachment section and that forms a twist element. The twist element has a star-shaped cross section with six flanges or arms. The flanges, which have an essentially constant material thickness, are greatly spread apart relative to each other. The yoke is made predominantly of composite fiber material. The individual flanges have an outer layer made of a fiber fabric. Due to the above-mentioned shape of the cross section as well as the great spread of the flanges or arms, an unfavorable warpage of the cross section profile can occur when the twist element is subjected to torsion.

German Published Application No. 2917301 discloses a bearingless rotor with an impact-flexible, swing-flexible and torsion-flexible structural element. The torsional flexibility gives the structural element the property of a twist element in addition to the impact-flexible and swing-flexible properties. This twist element has an essentially T-shaped or X-shaped cross section. The individual flanges or arms of the T-shaped or X-shaped cross section, which have an essentially constant thickness, are configured in the shape of slits.

For certain applications such as, for example, tilt rotors for a rotorcraft configured as a tilt rotor helicopter, it is necessary to configure the joint of a rotor blade to be as swing-stiff as possible. Due to the high loads that occur on the rotor, the twist element is required to have a high strength here. If the conventional twist elements were to be used in unchanged form for such an application purpose, this would cause the joint of a rotor blade to a rotor head to be too swing-flexible. Moreover, the strength of the twist element would no longer be adequately ensured. However, if the prior-art twist elements were designed so as to be sufficiently swing-stiff and stable, then the twist elements—due to the resultant excessively high torsional stiffness or twist stiffness—would no longer be adequately rotatable, which can have a detrimental effect especially on the controllability of a rotor equipped with such a twist element. Furthermore, such a twist element would be quite heavy and would have a very large overall diameter, which is undesirable from an aerodynamic standpoint as well as with an eye towards keeping the empty weight of a rotorcraft as low as possible. Finally, the prior-art twist elements are also very long, which is a drawback from an aerodynamic point of view since the total air resistance of the twist element is quite high and moreover, a relatively large area of the radius of the rotor cannot be used as an aerodynamically effective area of the rotor blade.

SUMMARY OF THE INVENTION

An object of the present invention is to provide a compact twist element with a high swing stiffness, along with a low torsional stiffness and twist stiffness and, at the same time, with a high torsional strength and twist strength. A further or alternate object is to provide a bearingless rotor and a rotorcraft with such a twist element.

The present invention provides a twist element for a bearingless rotor, which is made predominantly of composite fiber material, having an essentially symmetrical, flattened cross section that has approximately the contour of a horizontal section through the center of a double cone.

This twist element for a bearingless rotor, which is made predominantly of composite fiber material, has an essentially symmetrical, flattened cross section that has approximately the contour of a horizontal section through the center of a double cone. It can also be said that the contour has a shape that is similar to a "bow-tie" or a horizontal hourglass or the shape of two narrow, horizontal, essentially isosceles triangles that are joined together in the area where their tips face each other. In the most general sense, the contour could also be referred to as X-shaped, whereby, however, the areas between two adjacent legs of the "X" are largely filled up by composite fiber material.

The twist element according to the invention has a very high swing stiffness and, at the same time, a low torsional stiffness and twist stiffness as well as a high torsional strength and twist strength. When rotated, it is largely warpage-free. The twist element according to the invention has a relatively compact overall cross section while, at the same time, exhibiting a high strength. The twist element according to the invention is thus especially well-suited for tilt rotor applications. Since the twist element according to the invention, as mentioned above, is very rotation-flexible, then at a given rotational angle range, it can also be configured so as to be considerably shorter than prior-art twist elements. The length of the twist element according to the invention can be reduced to about one-third of the length of a conventional, prior-art twist element. This, in conjunction with the compact overall cross section, in turn, translates into considerable aerodynamic advantages: during the operation of the rotor, the total air resistance of the twist element is reduced and the proportion of the rotor radius length that is gained through the possible shortening of the twist element can be used as an aerodynamically effective rotor area of the rotor blade. This, in turn, reduces the total resistance of the rotor and improves its aerodynamic characteristics.

Additional preferred and advantageous embodiment features of the twist element according to the invention are the subject matter of the subordinate claims 2 through 13.

The present invention also provides a bearingless rotor having at least one twist element as described above. Moreover, the present invention provides a rotorcraft having at least one such bearingless motor.

The advantages that can be attained with the bearingless rotor according to the invention and with the rotorcraft according to the invention are essentially the same as those explained above in conjunction with the twist element according to the invention.

A preferred embodiment of the invention with additional embodiment details and further advantages is described and explained in greater detail below with reference to the accompanying drawing.

BRIEF DESCRIPTION OF THE DRAWING

The FIGURE shows a schematic cross sectional depiction of a twist element according to the invention.

DESCRIPTION OF A PREFERRED EMBODIMENT

The FIGURE shows a schematic cross sectional depiction of a twist element 2 for a bearingless rotor. The twist element 2 according to the invention is made predominantly of composite fiber material. As can be clearly seen in the drawing, said twist element 2 has a symmetrical, flattened cross section that has the contour shape of a horizontal section through the center of a double cone. As used herein, the term "symmetrical" is not limited to shapes that are exactly symmetrical, but may also be used to describe shapes that are approximately symmetrical. In addition, as is clear from the drawing, "having the contour shape", as used herein, means is not limited to having exactly the shape described but also includes elements having a contour shape that reasonably approximates the described shape. The horizontal center axis of the cross section of the twist element is designated with the reference letter H and the vertical center axis with the reference letter V. It can also be said that the contour of the cross section of the twist element has the shape of two relatively narrow, horizontal, essentially isosceles triangles that are oriented symmetrically with respect to the horizontal and vertical center axes H, V and that are joined together in the area where their tips face each other. This contour or cross section is almost completely filled up by composite fiber material, as will still be explained in greater detail below. The lengthwise direction or the longitudinal axis of the twist element is indicated by the reference letter A. The longitudinal axis A runs preferably radially with respect to the rotor circle of the rotor or it extends essentially parallel to the lengthwise direction of a rotor blade of the rotor.

As the FIGURE also shows, the above-mentioned cross section of the twist element is formed by two similar groups (S1 to S3 and S4 to S6) of webs S1 to S6 that are arranged opposite from each other mirror-symmetrically around the vertical center axis V. The webs S1 to S6 have a shared thin, flattened root area 4 that extends in an area around the longitudinal axis A and that constitutes a middle area of the cross section of the twist element. The webs S1 to S6 open up into this root area 4 or they start from it.

The webs S1 to S6 of each group (S1 to S3 and S4 to S6) are separated from each other by narrow gaps 6 and arranged above each other on each side of the vertical axis V. The thickness of each of the webs S1 to S6 increases starting from the root area 4 and going outwards towards the free lateral side edges of the twist element 2. The webs S1 to S6 have a very small spread relative to each other. The webs S1 to S6 themselves each have a wedge-shaped cross section similar to a horizontal or slightly slanted narrow triangle whose tip opens up into the root area 4.

Furthermore, the webs S1 to S6 in this embodiment—not only in the area of the lateral sides of the cross section of the twist element, but essentially over virtually their entire wedge-shaped cross section—have unidirectional, highly extensible reinforcement fiber packets 8 that are embedded in a suitable matrix such as, for example, an epoxy resin and that likewise have a largely wedge-shaped cross section with a thickness that increases towards the outside. The fibers of the unidirectional reinforcement fiber packets 8 run in the lengthwise direction A of the twist element 2 and thus in the centrifugal-force direction of a rotor blade (not shown here) of the rotor associated with the twist element 2.

The unidirectional reinforcement fiber packets 8 extend to the outer contour of the cross section of the twist element. Consequently, unlike in the state of the art, the unidirectional reinforcement fiber packets 8 are not covered or over-laminated at the outer contour of the cross section of the twist element by a fiber fabric cover layer or the like having a multidirectional fiber arrangement. The fibers of the uni-directional reinforcement fiber packets 8 are preferably carbon fibers. Depending on the application case, however, the reinforcement fiber packets 8 can additionally contain a small proportion of other types of fibers or they can even be made of other types of fibers.

The fibers of the unidirectional reinforcement fiber packets 8 are located in the cross sectional areas of the twist element 2 that undergo the greatest extension due to swinging movements of the rotor blade during the rotor operation and they can absorb very high loads here. Therefore, the above-mentioned embodiment of the cross section of the twist element and especially its webs S1 to S6 and unidirectional reinforcement fiber packets 8 ensure that a high swing stiffness can be achieved in spite of a relatively small width of the cross section of the twist element.

As is also shown in the drawing, the webs S1 to S6 in the lengthwise direction of the twist element 2 are each configured in the shape of slits. In this embodiment, a slit 10 is provided for each web S1 to S6. However, as a matter of principle, in addition to slit webs S1 to S6, there can also be webs that have no slits in the cross section of the twist element. In the webs S1 to S6 shown here, each slit 10 extends from a free lateral side edge of the cross section of the twist element towards the root area 4 and ends just before said root area 4. In the present case, the slits 10 of the upper and lower webs S1, S3 and S4, S6 have the same depth, whereas the slits 10 of each of the middle webs S2 and S5 have a lesser depth in comparison. The slits 10 are configured essentially rectilinearly. The individual slit longitudinal axes or their extensions preferably intersect in the center point (here: the longitudinal axis A) of the overall cross section of the twist element, as is described in the embodiment provided, in the immediate vicinity of the mid-point through the root area 4.

The slit 10 of each individual web S1 to S6 runs between (at least) two adjacent unidirectional reinforcement fiber packets 8. In the immediate vicinity of its slit 10, each web S1 to S6 has at least one reinforcement fiber fabric layer 12 that, starting from a lateral slit opening, runs in a U-shaped or loop-shaped manner around a slit base 10a and around the slit contour situated within the web S1 to S6. Therefore, this U-shaped or loop-shaped reinforcement fiber fabric layer 12 is also situated between two adjacent unidirectional reinforcement fiber packets 8 and is glued or laminated onto them.

As can also be seen from this FIGURE, two webs S1, S6 and S3, S4, which are arranged in pairs across from each other at the top and bottom of the cross section of the twist element, are fitted with at least one reinforcement fiber layer 14 that extends over the width of the appertaining web S1, S3 and over the root area 4 continuously to the other, corresponding, opposite web S6, S4 and over its width. The reinforcement fiber layer 14 is preferably a fiber fabric. The drawing clearly shows that each reinforcement fiber layer 14 (top and bottom) in the root area 4 extends all the way to the outer contour of the cross section of the twist element.

The lateral side surfaces of the webs S1 to S6 are inclined or slightly slanted with respect to the vertical center axis V by an angle $\alpha$ above and below the horizontal center axis H.

Depending on the application case, the number of webs can vary and can be a lower or higher number than the above-mentioned six webs S1 to S6.

The twist element 2 according to the invention is preferably an integral part of a rotor blade, of a rotor blade connection element, of a rotor blade joining element or of a rotor head element (e.g. a rotor head plate or a rotor head yoke). However, it can also be configured as a separate component. The twist element 2 can have connection elements at its end areas for the connection of adjacent components (e.g. for a rotor blade, if the twist element is configured as a separate component or as an integral component of a rotor head element).

The twist element 2 according to the invention is especially well-suited as a component of a bearingless rotor. According to the invention, a rotorcraft, especially a helicopter, especially a tilt rotor helicopter, is equipped with at least one bearingless rotor and with at least one such twist element 2.

The reference numerals in the claims, the description and the drawings all serve merely for better understanding of the invention and should not be construed as a limitation of the scope of protection.

What is claimed is:

1. A twist element for a bearingless rotor, comprising a composite fiber material, having a symmetrical, flattened cross section with an outer contour of a horizontal section through the center of a double cone, wherein the cross section includes a thin root area forming a middle area, and two similar groups of webs, wherein the webs of each of the two similar groups extend from the middle area and are separated from each other vertically by narrows gaps, each gap being substantially narrower than a thickness of each adjacent web, and wherein the thickness of each web increases with increasing distance from the middle area.

2. The twist element as recited in claim 1, wherein the webs each extend from the middle area to free lateral side edges of the twisted element and wherein the thickness of each web increases continuously from the middle area to the free lateral edges.

3. The twist element as recited in claim 1, wherein each of the webs have a wedge-shaped cross section having a tip meeting the root area.

4. The twist element as recited in claim 1, wherein the webs includes unidirectional reinforcement fiber packets disposed at least at an area of lateral sides of the cross-section of the twist element, each of the reinforcement fiber packets having fibers running in a lengthwise direction of the twist element.

5. The twist element as recited in claim 4, wherein the unidirectional reinforcement fiber packets extend to the outer contour of the cross section of the twist element.

6. The twist element as recited in claim 4, wherein the fibers of the unidirectional reinforcement fiber packets include carbon fibers.

7. The twist element as recited in claim 4, wherein each of the webs include at least one slit in a lengthwise direction of the twist element the at least one slit extending from a free lateral side edge of the cross section of the twist element towards the root area.

8. The twist element as recited in claim 7, wherein each of the at least one slits is configured essentially rectilinearly and wherein longitudinal axes defined by the slits pass through an area in an immediate vicinity of a center point of the cross section.

9. The twist element as recited in claim 8, wherein the longitudinal axes intersect each other at the center point.

10. The twist element as recited in claim 7, wherein at least one web includes at least two adjacent unidirectional reinforcement fiber packets and wherein the at least one slit of the at least one web extends between the at least two adjacent unidirectional reinforcement fiber packets.

11. The twist element as recited in claim 7, wherein each web includes at least two adjacent unidirectional reinforcement fiber packets and at least one reinforcement fiber fabric layer disposed in an immediate vicinity of the at least one slit and between the two adjacent unidirectional reinforcement fiber packets, the at least one reinforcement fiber fabric layer extending from a lateral slit opening of the slit in a U-shaped or loop-shaped manner around a base of the slit and around a contour of the slit.

12. The twist element as recited in claim 1, wherein at least one reinforcement fiber layer extends over a width of a first web in one of the two similar groups, over the root area, and continuously to a second web of the other of the two similar groups and over the width of the second web, wherein the first and second webs are arranged in a pair across from each other at a top and a bottom of the cross section of the twist element.

13. The twist element as recited in claim 1, wherein the webs include lateral side surfaces that are inclined at an angle relative to a vertical center axis of the cross section of the twist element above and below a horizontal center axis of the cross section of the twist element.

14. The twist element as recited in claim 1, wherein the twist element forms an integral part of one of a rotor blade, a rotor blade connection element, a rotor blade joining element and a rotor head element.

15. A bearingless rotor comprising at least one twist element as recited in claim 1.

16. A rotorcraft comprising at least one bearingless rotor as recited in claim 15.

17. The rotorcraft as recited in claim 16, wherein the rotorcraft is a helicopter.

* * * * *